United States Patent [19]

Siebert et al.

[11] Patent Number: 4,989,969
[45] Date of Patent: Feb. 5, 1991

[54] TIME OF FLIGHT VELOCIMETER

[75] Inventors: Edward T. Siebert, New Fairfield; Patrick R. Manzo, Danbury, both of Conn.

[73] Assignee: Hughes Danbury Optical Systems, Inc., Danbury, Conn.

[21] Appl. No.: 213,854

[22] Filed: Jun. 30, 1988

[51] Int. Cl.$^5$ ................................................. G01P 3/36
[52] U.S. Cl. .................................... 356/28; 73/861.06
[58] Field of Search ............... 356/28, 285; 73/861.05, 73/861.06

[56] References Cited

U.S. PATENT DOCUMENTS

| | | | |
|---|---|---|---|
| 3,941,477 | 3/1976 | Schodl | 356/28 |
| 4,162,509 | 7/1979 | Robertson | 356/28 |
| 4,506,979 | 3/1985 | Rogers | |
| 4,696,567 | 9/1987 | Ruger et al. | 356/28 |
| 4,707,130 | 11/1987 | Hofmann et al. | 356/28 |
| 4,804,263 | 2/1989 | Schodl | 356/28 |
| 4,859,055 | 8/1989 | Gal et al. | 356/28 |

FOREIGN PATENT DOCUMENTS 2109548  6/1983  United Kingdom .................. 356/28

OTHER PUBLICATIONS

"Laser Dual Focus Velocimeter", Polytec Optronics, Inc., Merrik, N.Y. undated.
"Final Report Real-Time Remote Measurement of Wind Speed by Laser Backscattered Single Particle Correlation Techniques", by C. She, Oct. 1977.
Mayo et al, "Laser Transit Anemometer with Microcomputer and Special Digital Electronics: Measurements in Supersonic Flows," ICIASF'79 Record, 24-26 Sep.'79, pp. 146-153.

Primary Examiner—Thomas H. Tarcza
Assistant Examiner—Linda J. Wallace
Attorney, Agent, or Firm—Wanda Denson-Low; William J. Streeter

[57] ABSTRACT

A time of flight velocimeter wherein a radiation source projects two parallel beams into an air mass. Each of the parallel beams converges into a waist portion. As an aerosol particle moves through the waist portion, part of the radiation of each of the beams is backscattered. This backscattered radiation is focused onto two detectors, one for each beam. Signals from the detectors, generated in response to the backscattered radiation, are processed to determine the velocity of the particle which has passed through the waist portion of the two beams.

26 Claims, 3 Drawing Sheets

4,989,969

TIME OF FLIGHT VELOCIMETER

FIELD OF THE INVENTION

The present invention relates to airborne velocimeters and, more particularly, to optical airborne velocimeters for making non-invasive measurements of gas flows.

BACKGROUND OF THE INVENTION

The three components of an aircraft's velocity are currently determined by comparing the stagnation pressure, measured by a pitot tube, with static pressure. Such devices are simple, reliable, relatively inexpensive and reasonably accurate. By their very nature, however, they must make their measurements in a region of space which is in close proximity to the aircraft and hence is disturbed by the presence of the aircraft itself. The pitot tubes, which protrude into the air mass, have the disadvantage of disturbing the very air mass which they are sensing. This problem becomes particularly acute near the speed of sound where the shock waves generated by the motion of the aircraft can significantly disturb the actual measurement. Pitot tubes and similar sensing elements increase drag on an air frame. In addition, prior art pneumatic systems have slow response times and are inaccurate at low velocities. As the accuracy of measurement of the parameter being measured decreases, the accuracy with which the aircraft can be controlled decreases. Accordingly, fuel and maintenance costs increase.

Another prior art technique for measuring gas velocities is one utilizing the laser Doppler principle and depends upon aerosol particles being constrained in the air. Aerosol particles are particles of water, dust or pollen that occur naturally in the atmosphere and range in size from several tens of microns down to almost molecular sizes. The smaller aerosol particles are actually entrained within the airstream and follow its motion exactly. Since these particles scatter light, it is possible to detect both their presence and motion. Thus by measuring the motion of the aerosol particles with respect to the aircraft, it is possible to deduce the velocity of the aircraft with respect to the air mass through which it is moving.

The laser Doppler velocimeter generates, in a volume remote from the aircraft, a fringe pattern resulting from constructive and destructive interference of two coherent beams of light. An aerosol particle traversing these fringes will alternately scatter light when it is in a region of constructive interference and not scatter light when it is in a region of destructive interference. A portion of the light is scattered back to the aircraft. Since the spacing between the fringes is known, the component of the aerosol particle's velocity normal to the fringe direction can be calculated by measuring the frequency of the back-scattered signal and combining this frequency with wavelength and beam separation parameters. As an example of a prior art device embodying the above principles, see U.S. Pat. No. 4,506,979 entitled "Compact Radiation Fringe Velocimeter for Measuring in Three Dimensions."

The laser Doppler velocimeter approach overcomes the disadvantages of the mechanical-pneumatic approach. It, however, does have the disadvantages of having a low sampling rate at high altitudes due to the absence of larger particles and consequently low data rates. It also requires coherent source and high energy to overcome background noise.

Accordingly, the present invention contemplates providing an improved non-invasive optical velocimeter which adds no drag to the aircraft's air frame, operates quickly and accurately, operates at low velocities, and has a high sampling rate and high data rates. In addition, the present invention is less susceptible to background noise.

BRIEF DESCRIPTION OF THE DISCLOSURE

In its simplest form, a time of flight velocimeter measures the time it takes for an aerosol particle to go from a starting point, at the waist of a first beam of light, to the finishing point, at the waist of a second beam of light. Accordingly, two beam waists are formed in a given volume parallel to one another. As an aerosol particle passes through each of the beam waists a certain amount of light is backscattered to two detectors, one for each waist, oriented to collect the backscattered light. The two impulses of backscattered light are detected by the two detectors and the transit time is measured.

There are several possible approaches to measuring the velocity of an aerosol particle in three axes. One such approach calls for the provision of three nominally orthogonal beam pairs and, concomitantly, three pairs of detectors.

It is possible to reduce the number of beam pairs required by combining several velocity component measurements into one system. If instead of using one detector for each pair of beam waists a linear detector array is used, then two velocity components can be measured, one normal to the array and one parallel to it. Another important advantage of utilizing a detector array is that since each detector element in the array sees only a small portion of the background, background noise is diminished. Another advantage of utilizing detector arrays is that it allows better separation of multiple particle events, thus improving measurement accuracy. It also allows large, non air-entrained particles to be discarded without discarding the measurable particles elsewhere in the beam.

The above-described approach can be extended to the simultaneous measurement of three axes velocity components. In this form the beam is imaged onto a two dimensional detector array. The velocity component normal to the detector array is determined by time of flight only. The other two velocity components are a function of time of flight and the coordinates of the intercept of the particle by the two beam waists. This form has the advantage of providing the average distance from the aircraft at which the measurement was made which allows the determination of velocity at infinity.

While the use of multiple detectors helps eliminate background, use of the velocimeter in daytime may require further background reduction. This is accomplished by pulsing the beam source. A CW system has a relatively low light power to background ratio. By going to a simple pulsed approach, the laser energy is concentrated while the background remains the same. A simple pulse system has a beam pulse longer than the time it takes a particle to cross a single beam. In this way, some backscattering from an aerosol particle is assured. In a pulse burst system the pulses are very short, much shorter than the crossing time, and occur at a very high rate so that several pulses are transmitted in a beam crossingtime. The envelope of the pulse bursts can be similar to the simple pulse burst or could be CW. Further background rejection is achieved by gating the detector on and off at the bursts rate. In this way background rejection is achieved based on the duty cycle of the pulse bursts.

Pulsed systems have the further advantage over CW of providing relatively high instantaneous power which allows the detection of very small particles. This increases the data rate which is especially important at high altitudes where aerosol particles are rare and much smaller.

It can thus be seen that we have provided a time of flight velocimeter which is operable in the presence of high backgrounds, is operable at high altitudes with good data rate, has improved separation of multiple particle events, can discard non-air entrained particles, can be used to measure one, two or three velocity components per particle by using a single detector or detector arrays, and can be used to predict velocity at any time.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specification.

DETAILED DESCRIPTION OF THE PREFERRED EMBODIMENT

While the description that follows characterizes the light source as being a laser, it should be understood that non-coherent sources can also be used. Laser illumination increases the intensity of the source, hence the sensitivity of the system.

Further, while the description that follows describes an aerosol particle moving in relation to the velocimeter, it should be understood that the invention described herein has equal applicability where the velocimeter is mounted on an airborne platform and consequently moves relative to an air entrained aerosol particle.

Figure 1:
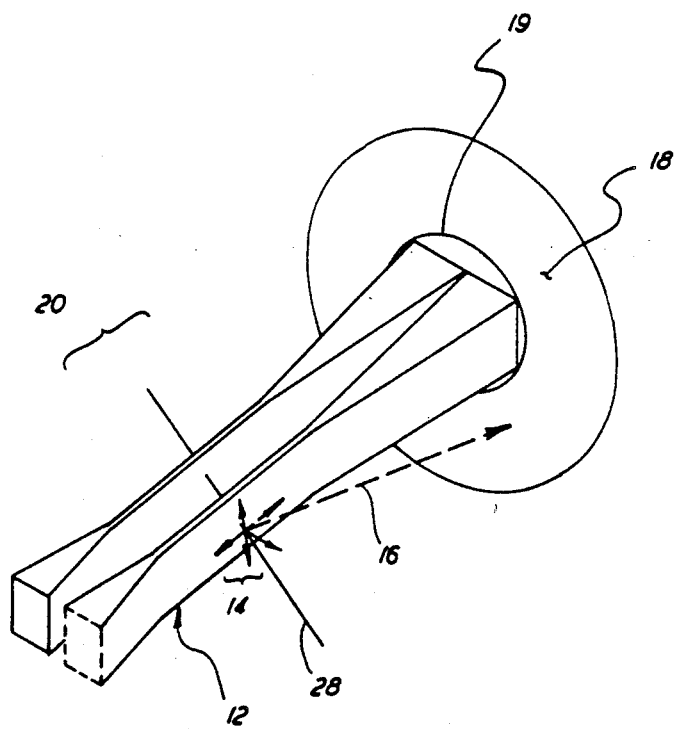
FIG. 1 shows, schematically, a time of flight velocimeter in accordance with the present invention.

FIG. 1 is a schematic representation of one embodiment of a time of flight velocimeter in accordance with the present invention.

The beam projector 19 projects two beams 10 and 12. The two beams 10 and 12 converge. Due to diffraction a waist region 20 is formed, the extent of which is characterized by a parameter called the Rayleigh range. See, *Elements of Modern Optical Design*, D. O'Shea, John Wiley & Sons, pp. 232–234 (1985). A particle, not shown, follows a path 28 through the waist region 20 of beams 10 and 12. Upon passing through the beams 10 and 12 the particle causes the light in the beams to be scattered as shown at 14. Of this scattered radiation 14 a certain portion is backscattered 16 to a lens 18 which focuses the backscattered radiation 16 onto two detectors, not shown.

FIG. 2 is a schematic representation of the optical configuration of the time of flight velocimeter of FIG. 1.

Light diverging from two light sources 23 and 24 in the beam projector 19 is caused to converge by two lenses 21 and 22, respectively, forming two beams 10 and 12, respectively. The two beams 10 and 12 converge to a waist portion 20, which extends for the Rayleigh range, then diverges again.

As an aerosol particle passes through the waist portion 20, along path 28, a certain amount of light in beams 10 and 12 is backscattered by that particle. A lens 18 focuses the region of interest in each beam, or the waist, onto detectors 25 and 26. The waist 20 of beam 12 is focussed by lens 18 onto detector 25. Similarly, the waist portion 20 of beam 10 is focused by the lens 18 onto detector 26. The light backscattered from the waist portion 20 of beam 12 is shown as return 16. Return 16, shown in cross-section, is a cone of radiation focused by lens 18 onto detector 25. Although there are regions of beam 10 that are viewed by detector 25 also, beam 10 is so out of focus at detector 25 that any scatter from it is generally not detectable. Also, the time constraints are so different that scatter from it is greatly discriminated against by the processing electronics. An aerosol particle passing through the beam at the narrow waist region produces a sharp crisp pulse while a particle passing through the overlap region between beam 10 and collection cone 16 passes through the beam where it is very broad and produces a low, wide pulse that is easily rejected electronically. Note that only light scattered from the waist region of beam 12 intersects with cone 16 and is focused onto detector 25. Light from particles passing through other parts of beam 12 is not collected. Also, while there is a small overlap region between beam 10 and collection cone 16, the geometry allows only a very small portion of the scattered light from beam 10 to be imaged onto detector 25 making such scattering events generally undetectable even before electronic discrimination. Thus we see that essentially only light from the waist region 20 of beam 12 is focused onto detector 25. In a similar fashion to that described hereinabove in reference to beam 12, beam 10 is focused by lens 18 onto detector 26.

It can be appreciated then that as an aerosol particle travels through the beam waists 20 of beams 10 and 12 along path 28 it will first backscatter light from beam 12. This backscattered light will be focused by lens 18 onto detector 25. Detector 25 will then send a detection signal to processing electronics 13. In one processing implementation, the detection signal then starts a timer in the processing electronics 13. As the aerosol particle passes through beam 10 backscattered radiation is focused by lens 18 onto detector 26. The detection signal from detector 26 is sent to the processing electronics 13 which stops the timer. The velocity of the aerosol particle is then calculated in the processing electronics 13 by solving the following equation:

$$V = s/t$$

Where: V = velocity of the aerosol particle
s = separation between beam 10 and beam 12
t = time between the detection signal from detector 25 and the detection signal from detector 26.

Figure 3:
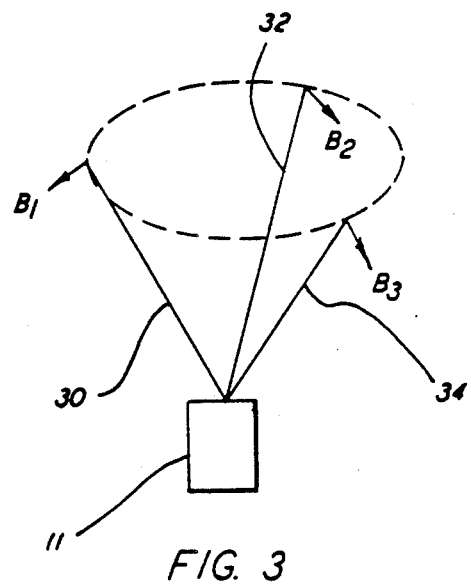
FIG. 3 shows, schematically, how three beam pairs can be located orthogonally to one another to measure three velocity components.

Since, in the form hereinabove described, each pair of beams only measures the velocity component normal to beam 10 and 12, three such systems are required to measure three velocity components. Such a system is shown in FIG. 3 where a transceiver 11 sends out three beam pairs 30, 32 and 34 and receives backscattered radiation from the three beam pairs. Best performance is achieved if the beam angles are chosen according to the accuracies required in each direction. If equal accuracies in all directions is desired, orthogonal beam pairs perform best. If packaging constraints are not a problem, the transmitters and receivers can be separately located.

Since the beam width, w, is much smaller than the beam separation s (see FIG. 4), the laser energy is much more highly concentrated than in prior art multiple fringe device. This concentration of energy provides better background detection, the detection of smaller particles (and hence better data rate), and better resolution than the prior art device of U.S. Pat. No. 4,506,979.

Figure 2:
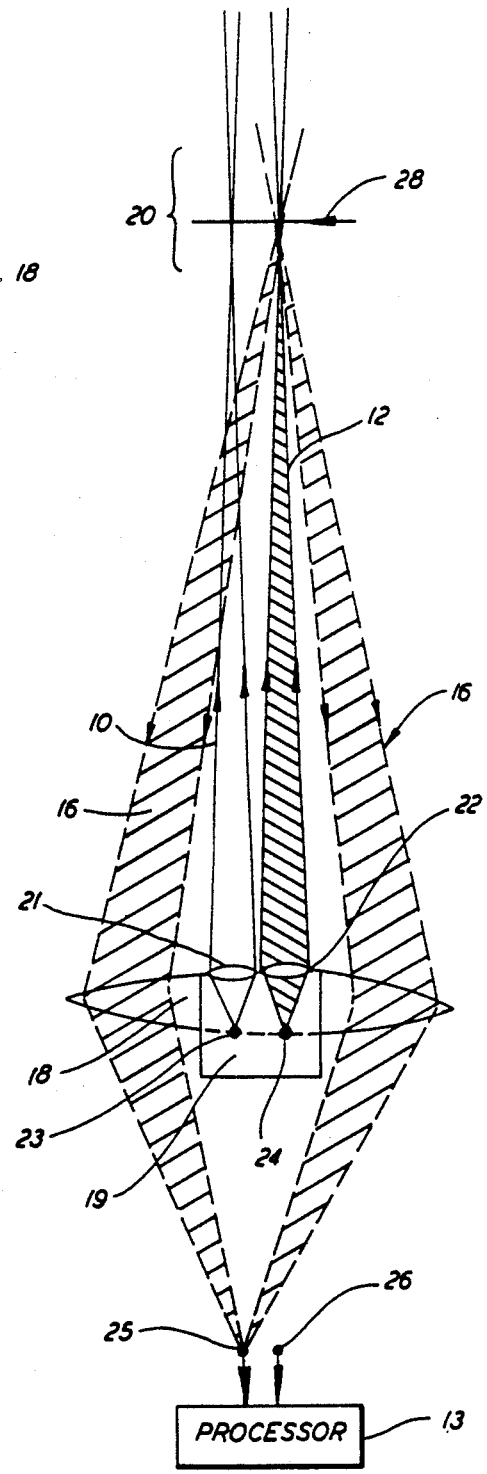
FIG. 2 is a schematic representation of the optical configuration of the time of flight velocimeter of FIG. 1.
Figure 4:
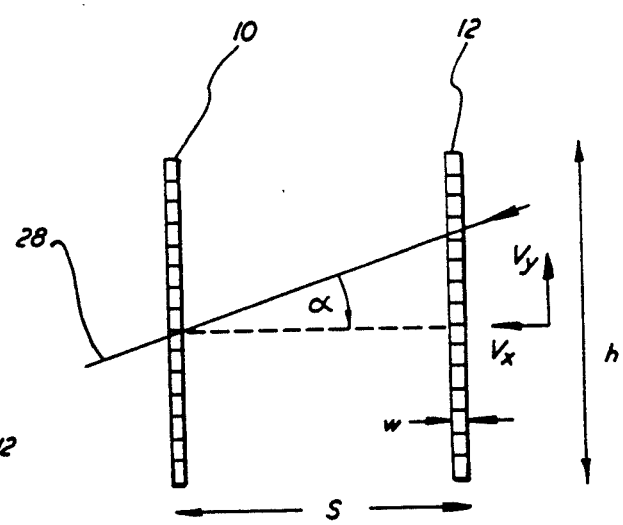
FIG. 4 shows, schematically, how a linear array can be used to measure two velocity components through a single beam pair.

Another form of the present invention provides for the combination of several velocity component measurements into one system. If, instead of using the single detectors 25 and 26 of FIG. 2, linear detector arrays are used, two velocity components can be measured. FIG. 4 shows, schematically, the waist portion 20 of the two beams 10 and 12 where such a system is employed. The waist portion of beam 12 is shown divided into a plurality of elements, each of which is imaged onto a corresponding element in the linear detector array, which replaces detector 25 in FIG. 2. $V_x$ is the velocity component of an aerosol particle, following path 28, in a direction normal to the two beams 10 and 12. $V_x$ is computed in the manner described hereinabove in reference to FIG. 2, that is, by solving the equation $V = s/t$. $V_y$ equals $s \tan \alpha/t$, where s and t have been previously defined and $\alpha$ is the angle between the path of the aerosol particle and an imaginary line normal to the two beam paths 10 and 12. The angle $\alpha$ can be readily computed in the processor 13 since s is known as is the point at which the aerosol particle enters beam 12 and beam 10. In general, the width of the beams, w, is kept small compared to their separations and height, h, to provide good velocity resolution. This resolution plus the ability to interpolate between elements determines the accuracy to which $V_x$ and $V_y$ can be determined.

Figure 5:
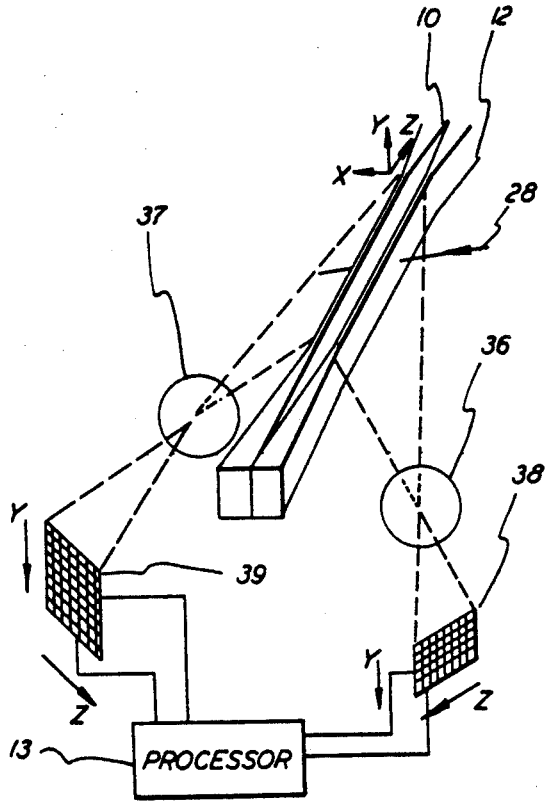
FIG. 5 shows, schematically, how a two-dimensional array can be used to measure three velocity components through a single beam pair.

This approach can be extended to the simultaneous measurement of all three velocity components through the use of the system shown in FIG. 5. In this form the beams 10 and 12 are imaged by lenses 37 and 36, respectively, onto two-dimensional detector arrays, 39 and 38, respectively. It can be understood that the two lenses, 36 and 37, can be combined into one in the manner described hereinabove in reference to FIG. 2. Thus detector array 39 would replace detector 25 and detector array 38 would replace detector 26 in FIG. 2. It is also possible to use a single sided system in which the two detector arrays are combined behind one lens.

As described in reference to FIG. 4, the velocity component of an aerosol particle normal to both beams 10 and 12 is equal to $V_x = s/t$. By imaging the backscattered radiation from beam 12 onto detector array 38 the y and z position at which the aerosol particle enters beam 12 is known and is sent to the processor 13. Likewise the y and z position at which the aerosol particle leaves beam 10 is known since the waist portion of beam 10 is imaged on detector 39. From the foregoing coupled with the beam separation(s) and time of flight (t) the velocity of the aerosol particle in the y direction ($V_y$) and in the z direction ($V_z$) can be calculated.

$$V_y = s \tan \alpha / t \tag{3}$$

$$V_z = s \tan \beta / t \tag{4}$$

Where: $\alpha$ = the angle that the particle's path 28 makes with a line normal to beam paths 10 and 12, $\theta$ lies in an x-y plane,
$\beta$ = the angle that the particle's path 28 makes with a line normal to the beam paths 10 and 12, $\theta$ lies in an x-z plane.

The computation of equations 3 and 4 is performed in the processor 13.

The use of multiple detectors helps to reduce noise. If one detector is replaced by an array of N detectors, each detector in the array sees 1/N of the background. This reduces the background noise and makes the system more noise-in-signal limited, which is the ultimate performance limit. In addition, the two-dimensional detector array approach can be used to measure the average distance from the aircraft at which a measurement is made. This is due to the fact that the exact location at which an aerosol particle enters each of beams 10 and 12 is known. This knowledge allows better extrapolation to the velocity at infinity.

It should be noted that in all of the above approaches the average time of intercept can be measured as well as the time of flight. The intercept time at which an aerosol particle enters beam 12 of the drawing is a random event. The velocity of the aerosol particle and the intercept time can be used in a predictor algorithm to give the velocity at any other time. The predictor reduces the problem of time lag in the control servos and can provide estimated velocity during a momentary drop out.

Figure 6:
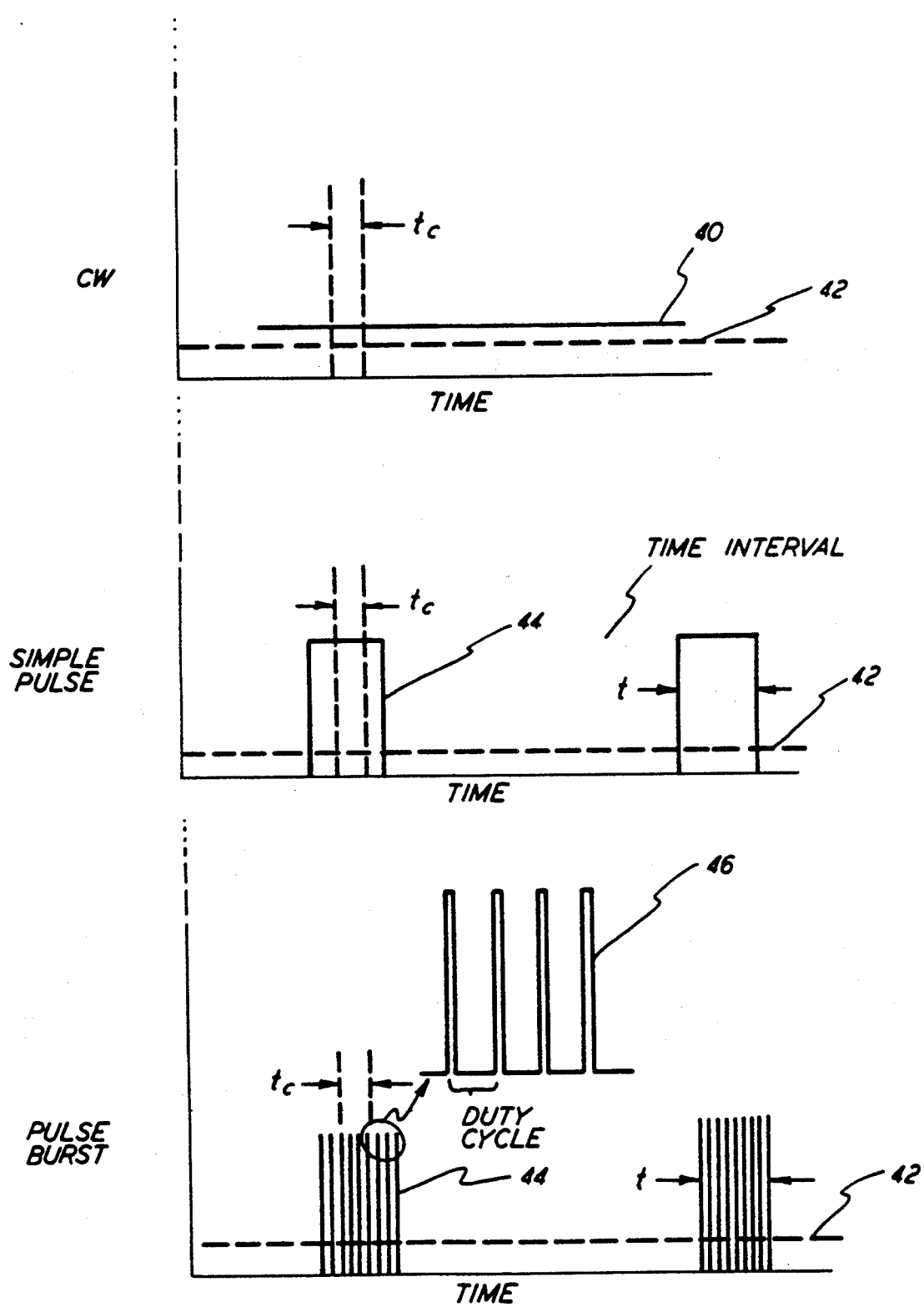
FIG. 6 shows, graphically, the temporal characteristics of CW, simple pulse and pulse burst systems.

Background can be further reduced through the use of pulsed light sources, as illustrated graphically in FIG. 6.

The graph of CW laser energy versus time illustrates that a CW system has a relatively low laser power 40 to background 42 ratio. $\tau_c$ is the average crossing time for an aerosol particle to cross a single beam.

A simple pulsed system, as shown, has a laser pulse longer than the time it takes a particle to cross a single beam. This increases the laser power to background ratio by the reciprocal of the pulse duty cycle (for the same average power) but reduces the number of particles detected (data rate) by the duty cycle unless the particle size sensitivity is increased.

Pulsed systems also provide for the detection of smaller particles. The smaller the particle that can be detected the higher the data rate. Smaller particles, however, require more laser power to be detected. Since a pulsed system is capable of providing very high instantaneous powers, it can detect very small particles. The increase in detectable particles more than offsets the number missed when the laser is off, thus a net increase in data rate is realized. This is essential for accurate velocity determinations at high altitudes where aerosol particles are rare.

In a pulsed burst system, illustrated by the bottom graph in FIG. 6, the, pulses 46 are very short, shorter than the crossing time $\tau_c$, and occur at a very high rate so that several pulses are transmitted in a crossing time $\tau_c$. The envelope of the pulse bursts 44 can be similar to the simple pulse approach or can be CW. If the detector can be gated on and off at the burst rate, an additional rejection of the background 42 is achieved based on the duty cycle of the pulse bursts 46. There is no loss of particle detection as long as there are several pulses per crossing time. Therefore, a pulse burst system provides increased background rejection with no less in data rate. In fact, the data rate can improve due to the detection of smaller particles as described above.

There has thus been described an optical velocimeter which can determine velocity of aerosol particles in three orthogonal directions accurately and simply with high data rates and at high altitudes.

While the present invention has been shown and described with reference to a preferred embodiment thereof, it will be understood by those skilled in the art that changes in form or details may be made therein without departing from the scope and intent of the invention. Accordingly, it is understood that the invention is to be broadly construed within the spirit and scope of the claims.

What is claimed is:

1. A time of flight velocimeter comprising:
   a radiation source projecting a first beam and a second beam which converge into a first and second waist portion, respectively; each said waste portion extending longitudinally and having an elongated height;
   a first detector means and a second detector means positioned to receive radiation backscattered by a particle intersecting said first and second waist portions, respectively, each of said first and said second detector means being comprised of an array of discrete detector elements;
   means to focus the first and second waist portions onto said first and second detector means, respectively; and
   processor means to receive signals from said first and second detector means in response to backscattered radiation and calculate the particle velocity.

2. A time of flight velocimeter as claimed in claim 1 wherein said radiation source is CW.

3. A time of flight velocimeter as claimed in claim 1 wherein said radiation source is pulsed for a time greater than the time it takes a particle to cross said first or said second beam.

4. A time of flight velocimeter as claimed in claim 1 wherein said radiation source generates a burst of pulses for a first time period with said pulses being spaced by a second time period.

5. A time of flight velocimeter as claimed in claim 4 wherein said first time period is at least as long as the time it takes a particle to cross said first or said second beam.

6. A time of flight velocimeter as claimed in claim 5 wherein said second time period is less than the time it takes a particle to cross said first or said second beam.

7. A time of flight velocimeter as claimed in claim 1 wherein said means to focus is a lens.

8. A time of flight velocimeter as claimed in claim 1 wherein said first detector means and said second detector means are linear detector arrays.

9. A time of flight velocimeter as claimed in claim 1 wherein said first detector means and said second detector means are two dimensional detector arrays.

10. A time of flight velocimeter as claimed in claim 1 wherein said waist portion has a width which is small relative to said waist height.

11. A time of flight velocimeter as claimed in claim 1 wherein said waist height is sufficiently high for airplane velocity data rate sampling.

12. A time of flight velocimeter comprising:
    a radiation source projecting a first beam and a second beam which converge into a first and second waist portion, respectively; said radiation source generating a burst of pulses for a first time period with said pulses being spaced by a second time period, wherein the first time period has a greater duration than the second time period;
    a first detector means and a second detector means positioned to receive radiation backscattered by a particle intersecting said first and second waist portions, respectively;
    means to focus the first and second waist portions onto said first and second detectors, respectively; and
    processor means to receive signals from said first and second detector means in response to backscattered radiation and calculate the particle velocity.

13. A time of flight velocimeter comprising:
    a radiation source projecting a first beam and a second beam which converge into a first and second waist portion, respectively; said radiation source generating a burst of pulses for a first time period with said pulses being spaced by a second time period; said first time period being at least as long as the time it takes a particle to cross said first or said second beam, said second time period having a shorter duration than said first time period;
    a first detector means a second detector means positioned to receive radiation backscattered from said first and second waist portions, respectively;
    means to focus the first and second waist portions onto said first and second detectors, respectively; and
    processor means to receive signals from said first and second detector means in response to backscattered radiation and calculate the particle velocity.

14. A time of flight velocimeter comprising:
    a radiation source projecting a first beam and a second beam which converge into a first and second waist portion, respectively;
    a first detector means and a second detector means positioned to receive radiation backscattered from said first and second waist portions, respectively; said first and second detector means being linear detector arrays;
    means to focus the first and second waist portions onto said first and second detectors, respectively; and processor means to receive signals from said first and second detector means in response to backscattered radiation and calculate the particle velocity.

15. A time of flight velocimeter comprising:
a radiation source projecting a first beam and a second beam which converge into a first and second waist portion, respectively;
a first detector means and a second detector means positioned to receive radiation backscattered from said first and second waist portions, respectively; said first and second detector means being two dimensional detector arrays;
means to focus the first and second waist portions onto said first and second detectors, respectively; and
processor means to receive signals from said first and second detector means in response to backscattered radiation and calculate the particle velocity.

16. An aircraft velocimeter for simultaneously measuring three components of aircraft velocity comprising
radiation source means for projecting at least one beam pair with each beam converging into a waist portion,
each said waist portion extending longitudinally and having an elongated height sufficient for aircraft velocity data rate sampling,
detector means for receiving radiation backscattered from particles passing through said waist portions for simultaneous determination of three velocity components, said detector means comprising an array of discrete detector elements,
means to focus said waist portions on said detector means, and
processor means for receiving signals from said detector means in response to backscattered radiation and calculating aircraft velocity.

17. An aircraft velocimeter as set forth in claim 16 wherein
said radiation source means projects three beam pairs with each beam converging into a waist portion and
each said waist portion extends longitudinally and has an elongated height sufficient for aircraft velocity data rate sampling.

18. An aircraft velocimeter as set forth in claim 17 wherein said three beam pairs are nominally orthogonal.

19. An aircraft velocimeter as set forth in claim 16 wherein said detector means comprises at least one linear detector array.

20. An aircraft velocimeter as set forth in claim 16 wherein said detector means comprises at least one two-dimensional detector array.

21. An aircraft velocimeter as set forth in claim 16 wherein said radiation source means is CW.

22. An aircraft velocimeter as set forth in claim 16 wherein said radiation source means is pulsed on for a time greater than the time it takes a particle to cross said waist of a beam.

23. An aircraft velocimeter as set forth in claim 16 wherein said radiation source means generates a burst of pulses for a first time period with said pulses being spaced by a second time period, said second time period being shorter in duration than said first time period.

24. An aircraft velocimeter as set forth in claim 23 wherein said first time period is at least as long as the time it takes a particle to cross said waist portion of a beam.

25. An aircraft velocimeter as set forth in claim 16 wherein said waist portion has a width which is small relative to said waist height.

26. An aircraft velocimeter as set forth in claim 16 wherein the radiation source means generates a burst of optical pulses for projecting said at least one beam pair and wherein said detector means is gated on and off in synchronism with the burst of optical pulses.

* * * * *